United States Patent
Krebs et al.

(10) Patent No.: US 7,129,312 B1
(45) Date of Patent: Oct. 31, 2006

(54) ADHESION PROMOTERS FOR MONOMER-FREE REACTIVE POLYURETHANES

(75) Inventors: Michael Krebs, Hilden (DE); Christoph Lohr, Wuppertal (DE); Andreas Brenger, Duesseldorf (DE)

(73) Assignee: Henkel Kommanditgesellschaft Auf Aktien (Henkel KGAA), Duesseldorf (DE)

( * ) Notice: Subject to any disclaimer, the term of this patent is extended or adjusted under 35 U.S.C. 154(b) by 121 days.

(21) Appl. No.: 10/148,432

(22) PCT Filed: Nov. 25, 2000

(86) PCT No.: PCT/EP00/11771

§ 371 (c)(1),
(2), (4) Date: May 29, 2002

(87) PCT Pub. No.: WO01/40342

PCT Pub. Date: Jun. 7, 2001

(30) Foreign Application Priority Data

Nov. 29, 1999 (DE) ............... 199 57 351
Nov. 10, 2000 (DE) ............... 100 55 786

(51) Int. Cl.
*C08G 18/10* (2006.01)
*C08G 18/32* (2006.01)

(52) U.S. Cl. ............... 528/59; 252/182.2; 252/182.22; 528/60; 528/65; 528/66; 528/67; 528/76; 528/80; 528/85; 528/905; 560/25; 560/26; 560/115; 560/158; 560/330; 560/335; 560/336; 560/354; 560/355; 560/358; 560/359; 560/360

(58) Field of Classification Search ............... 528/59, 528/60, 65, 66, 67, 76, 80, 85, 905; 252/182.2, 252/182.22; 560/25, 26, 115, 158, 330, 335, 560/336, 354, 355, 358, 359, 360
See application file for complete search history.

(56) References Cited

U.S. PATENT DOCUMENTS

| | | | | |
|---|---|---|---|---|
| 4,038,239 A | * | 7/1977 | Coyner et al. | 524/872 |
| 4,385,171 A | * | 5/1983 | Schnabel et al. | 528/491 |
| 4,487,910 A | * | 12/1984 | Bauriedel | 528/65 |
| 4,552,902 A | * | 11/1985 | Nafziger et al. | 521/129 |
| 4,672,100 A | * | 6/1987 | Schonbachler et al. | 528/75 |
| 4,910,332 A | | 3/1990 | Kahl et al. | 560/351 |
| 4,935,486 A | | 6/1990 | Wellner | 528/67 |
| 5,115,071 A | * | 5/1992 | Quay et al. | 528/59 |
| 6,133,415 A | | 10/2000 | Markley et al. | 528/497 |
| 6,515,164 B1 | * | 2/2003 | Bolte et al. | 560/25 |

FOREIGN PATENT DOCUMENTS

| | | |
|---|---|---|
| CA | 2 014 508 | 10/1990 |
| DE | 197 00 014 | 7/1998 |
| EP | 0 340 584 | 4/1989 |
| EP | 0 393 903 | 10/1990 |
| EP | 0 316 738 | 4/1992 |
| EP | 0 827 995 | 3/1998 |
| WO | WO 95/06124 | 3/1995 |
| WO | WO 97 46603 | 12/1997 |
| WO | 98/29466 | * 7/1998 |

OTHER PUBLICATIONS

H. F. Huber et al., Shaping Reactive Hotmelts Using LMW Copolyesters, Adhesives Age, Nov. 1987, pp. 32 to 35.
Kudishina et al., Sin., Fiz.-Khim, Polim, Part 7, pp. 125-129 (1970).
Kunststoff-Handbuch, vol. 7, Polyurethane, G.W. Becker (editor), Hanser-Verlag, Minich 3rd Edition, p. 425 (1993).

* cited by examiner

Primary Examiner—Rabon Sergent
(74) Attorney, Agent, or Firm—Woodcock Washburn LLP

(57) ABSTRACT

Polyurethane compositions are produced in a two-stage method. In a first step, a diol component with a molecular weight of less than 2000 is reacted with a monomeric diisocyanate with a molecular weight of less than 500 and the unreacted monomeric diisocyanate is removed from this reaction product. In a second step, the resulting high-molecular diisocyanate is reacted with a polyol to produce a reactive prepolymer with isocyanate and groups. The addition of polyisocyanates which are capable of migration and which have a substantially lower vapor pressure than diphenylmethanediisocyanate, improves the addition behavior of the invention polyurethane compositions. Reactive polyurethane compositions of this type are suitable for using as binding agents for reactive one or two component adhesives/sealants, which may optionally contain solvents. These compositions are also suitable for producing reactive hot melt adhesives when suitable polyols are selected. A substantial advantage of these compositions compared to known polyurethane compositions is the considerably lower proportion of monomeric diisocyanates with a molecular weight of less than 500.

32 Claims, No Drawings

ADHESION PROMOTERS FOR MONOMER-FREE REACTIVE POLYURETHANES

BACKGROUND OF THE INVENTION

1. Field of the Invention

This invention relates to compositions based on polyols and high molecular-weight diisocyanates with a low content of monomeric diisocyanates, and to their production and their use as binders for reactive one- or two-pack adhesives/sealants, reactive hot melt adhesives or solvent-based polyurethane adhesives.

Reactive polyurethane adhesives/sealants, particularly one-pack, moisture-curing systems, generally contain polymers that are liquid at room temperature with urethane groups, optionally urea groups and reactive isocyanate groups. For many applications, these compositions are solvent-free and very highly viscous and/or paste-like, and they are processed at room temperature or at a slightly elevated temperature of between about 50° C. and about 100° C.

2. Description of the Related Art

Reactive, one-pack, moisture-curing polyurethane hot melt adhesives are moisture-curing or moisture-crosslinking adhesives that are solid at room temperature and are applied as an adhesive in the form of their melt, and the polymer components of which contain urethane groups and reactive isocyanate groups. As a result of the cooling of this melt after application and joining of the substrate parts to be bonded, a rapid physical setting of the hot-melt adhesive first takes place by means of its solidification. This is followed by a chemical reaction of the isocyanate groups still present with moisture from the environment to form a crosslinked, infusible adhesive. Reactive hot-melt adhesives based on isocyanate-terminated polyurethane prepolymers are described e.g. by H. F. Huber and H. Müller in "Shaping Reactive Hotmelts Using LMW Copolyesters", Adhesives Age, November 1987, pages 32 to 35.

Laminating adhesives can either be constituted similarly to the reactive hot melt adhesives or they are applied as one-pack systems from a solution in organic solvents; a further embodiment consists of two-pack, solvent-based or solvent-free systems in which the polymer constituents of the one component contain urethane groups and reactive isocyanate groups and, in the two-pack systems, the second component contains polymers or oligomers with hydroxyl groups, amino groups, epoxy groups and/or carboxyl groups. In these two-pack systems the isocyanate group-containing component and the second component are mixed immediately before application, usually with the aid of a mixing and dispensing system.

Reactive polyurethane adhesives/sealants are distinguished by a very high overall performance. In the last few years, therefore, more and more new applications have been opened up for these adhesives/sealants. Compositions for such adhesives and/or sealants are already known from very many patent applications and other publications.

In addition to many advantages, these polyurethane compositions also have some disadvantages caused by the system. One of the most serious disadvantages is the residual monomer content of isocyanates, especially the more volatile diisocyanates. Adhesives/sealants, and especially the hot melt adhesives, are processed at an elevated temperature. The hot melt adhesives, for example, are processed at between 100° C. and 200° C., laminating adhesives between room temperature and 150° C. Even at room temperature, volatile isocyanates such as TDI or IPDI have a not insignificant vapour pressure. This noticeable vapour pressure is particularly serious especially in the case of spray application, since in this case significant quantities of isocyanate vapors can occur over the object being treated, which are toxic owing to their irritant and sensitising action. Protective measures must therefore be taken to prevent health hazards to persons charged with the processing. These measures, such as e.g. the requirement to monitor compliance with the maximum allowable concentration, are expensive. In particular, exhaust ventilation measures for the vapours at the point of formation and delivery are very cost-intensive and also form an obstacle to certain application methods, such as in particular the spray application of reactive polyurethane adhesives/sealants.

The development of reactive polyurethane compositions with a drastically reduced proportion of monomeric diisocyanates is therefore highly desirable for these fields of application, as in some cases this would make it possible to use them in many applications in which their use was not previously possible owing to the workshop hygiene problems mentioned above.

According to the Schulz-Flory statistical model, when diisocyanates with isocyanate groups of approximately equal reactivity are reacted with hydroxyl group-containing compounds, the remaining content of monomeric diisocyanate in the reaction product depends on the NCO/OH ratio of the reactants in the prepolymer synthesis. With an NCO/OH ratio of 2, as is frequently necessary for the prepolymer composition, approximately 25% of the monomeric diisocyanate used remains as a monomer in the prepolymer. If, for example, 10 wt. % diphenylmethane diisocyanate (MDI) is used in a prepolymer synthesis with an NCO/OH ratio of 2, an order of magnitude of approximately 2 wt. % monomeric MDI is found in the prepolymer in accordance with the statistical estimate mentioned above. At 150° C. the pure MDI already has a vapour pressure of 0.8 mbar. While it is true that, according to Raoult's law, this vapour pressure is lower in compositions, it is still higher than the non-toxic range for workshop hygiene. Under the application conditions described above, especially when being applied as a hot melt adhesive over a large area in a thin layer, considerable quantities of the residual monomer therefore pass into the air space above and must be removed by exhaust ventilation. A significant reduction in the monomer content by a power of ten, by reducing the NCO/OH ratio, cannot generally be achieved in practice since the average molecular weight would then increase exponentially and the resulting polyurethane compositions would become extremely viscous and would be impossible to process. In practice, therefore, other routes are taken for prepolymer synthesis. For example, synthesis is performed with a sufficiently high NCO/OH ratio and the monomeric diisocyanate removed in a second step after pre-polymerisation; this can take place by distilling off the unreacted monomeric diisocyanate under vacuum, for example, or by subsequent chemical bonding of the monomeric diisocyanate. Thus, EP-A-316738 describes a process for the production of polyisocyanates containing urethane groups with a urethane group-free starting diisocyanate of no more than 0.4 wt. % by reacting aromatic diisocyanates with polyhydric alcohols and subsequently removing the unreacted, excess starting diisocyanate, the removal of the excess starting diisocyanate by distillation taking place in the presence of an aliphatic polyisocyanate containing isocyanate groups.

EP-A-0393903 describes a process for the production of prepolymers in which, in a first step, monomeric diisocyanate is reacted with a polyol. A catalyst is then added in a sufficient quantity for a considerable proportion of the residual isocyanate functionality to be converted to allophanate functionality. When the theoretical NCO content is reached, the reaction is stopped by rapid cooling and addition of salicylic acid.

WO-95/06124 describes polyurethane compositions with a low proportion of monomeric diisocyanates which are produced by reacting polyols with trifunctional isocyanates and optionally adding monofunctional chain terminators. A disadvantage of this process is the low availability of trifunctional, low molecular-weight isocyanates; the trifunctional homologues of diphenylmethane diisocyanate in particular are not commercially available in pure form.

In the work by V. A. Kudishina and E. F. Morgunova, Sin. Fiz. -Khim. Polim. (1970), part 7, 125–129, cold-curing polyurethane adhesives based on hydroxyfunctional polyesters or polyethers and isocyanate-containing hardeners are described. The isocyanate-containing hardeners are reaction products of tolylene diisocyanate (TDI) or of diphenylmethane diisocyanate (MDI), ethylene glycol and glycerin. It is stated that these hardener components lead to a substantial reduction in the toxicity of the adhesives, although these still produce a quantity of isocyanate of 1.7% in the air space of the corresponding test chamber. These workplace concentrations of isocyanates are no longer tolerable in industrialised western countries under today's standards of workshop hygiene.

Despite the aforementioned prior art, therefore, there is still a need for improved polyurethane compositions with a low proportion of monomeric diisocyanates that are suitable for use as adhesives/sealants, especially for reactive hot melt adhesives. In particular, the raw materials used for these should be readily and cheaply accessible and readily converted, and the adhesion properties should be at least equal to those of the conventional hot melt adhesives.

BRIEF SUMMARY OF THE INVENTION

The achievement of the object according to the invention can be taken from the claims. It consists substantially in the provision of reaction products of polyols and high molecular-weight diisocyanates.

Another achievement of the object according to the invention consists in adding to the aforementioned reaction products of polyols and high molecular-weight diisocyanates, migratory polyisocyanates having a substantially lower vapour pressure than e.g. monomeric diphenylmethane diisocyanate (MDI).

The present invention also provides a process for the production of these reaction products of polyols and high molecular-weight diisocyanates. In a first step of this process, the diol component with an average molecular weight (number average Mn) of less than 2000, especially less than 1500, is reacted with a large stoichiometric excess of monomeric diisocyanate with a molecular weight of less than 500 to give a high molecular-weight diisocyanate. After this reaction, the high molecular-weight diisocyanate is precipitated out of the reaction mixture, optionally by adding a non-solvent, and freed from unreacted diisocyanate by filtration or centrifugation. In a subsequent second step, this high molecular-weight diisocyanate is reacted with a polyol so that a reactive prepolymer with isocyanate terminal groups is formed having a very small content of monomeric diisocyanates with a molecular weight of less than 500. In a preferred embodiment, at least one migratory polyisocyanate with a low vapour pressure is then added to this reactive prepolymer with a very small content of monomeric volatile diisocyanates.

Another process for the production of such compositions consists in the fact that, after the first step of reacting the diol component with the monomeric diisocyanate, the excess monomeric diisocyanate is removed from the reaction mixture by distillation or removed from the reaction mixture by selective extraction and then, in a second step, this high molecular-weight diisocyanate is also reacted with a polyol to give a reactive prepolymer with isocyanate terminal groups. In the case of a prepolymer with isocyanate terminal groups purified in this way too, in a preferred embodiment at least one migratory polyisocyanate with substantially lower vapour pressure than MDI is added for adhesive applications according to the invention.

DETAILED DESCRIPTION OF THE INVENTION

Monomeric diisocyanates within the meaning of this invention are those aromatic, aliphatic or cycloaliphatic diisocyanates having a molecular weight of less than 500. Examples of suitable aromatic diisocyanates are all isomers of tolylene diisocyanate (TDI), either as a pure isomer or as a mixture of several isomers, 1,5-naphthalene diisocyanate (NDI), 1,4-naphthalene diisocyanate (NDI), diphenylmethane 4,4'-diisocyanate (MDI), diphenylmethane 2,4'-diisocyanate and mixtures of 4,4'-diphenylmethane diisocyanate with the 2,4' isomer, xylylene diisocyanate (XDI), 4,4'-diphenyldimethylmethane diisocyanate, di- and tetraalkyldiphenylmethane diisocyanate, 4,4'-dibenzyl diisocyanate, 1,3-phenylene diisocyanate, 1,4-phenylene diisocyanate. Examples of suitable cycloaliphatic diisocyanates are the hydrogenation products of the aforementioned aromatic diisocyanates, such as e.g. 4,4'-dicyclohexylmethane diisocyanate ($H_{12}$MDI), 1-isocyanatomethyl-3-isocyanato-1,5,5-trimethylcyclohexane (isophorone diisocyanate, IPDI), cyclohexane 1,4-diisocyanate, hydrogenated xylylene diisocyanate ($H_6$XDI), 1-methyl-2,4-diisocyanatocyclohexane, m- or p-tetramethylxylene diisocyanate (m-TMXDI, p-TMXDI) and dimerised fatty acid diisocyanate. Examples of aliphatic diisocyanates are tetramethoxybutane 1,4-diisocyanate, butane 1,4-diisocyanate, hexane 1,6-diisocyanate (HDI), 1,6-diisocyanato-2,2,4-trimethylhexane, 1,6-diisocyanato-2,4,4-trimethylhexane, lysine diisocyanate and 1,12-dodecane diisocyanate ($C_{12}$DI).

These monomeric diisocyanates are reacted with low molecular-weight diols in a first reaction step to give high molecular-weight diisocyanates. The diols used for this purpose have an average molecular weight (number average Mn) of less than 2000, preferably less than 1500. The OH number of the diol, determined in accordance with DIN 53240, is decisive for the number average.

In principle, all linear or slightly branched $C_2$–$C_{18}$ alkanediols can be used for this purpose. In addition, low molecular-weight polyethers and low molecular-weight alkoxylation products of aromatic dihydroxy compounds (diphenols) can be used.

Specific examples of the diols to be used according to the invention are ethylene glycol, 1,2-propanediol, 1,3-propanediol, 2,2-dimethyl-1,3-propanediol, 2-methylpropanediol, 1,6-hexanediol, 2,4,4-trimethyl-1,6-hexanediol, 2,2,4-trimethyl-1,6-hexanediol, 1,4-cyclohexanedimethanol, diethylene glycol, triethylene glycol, tetraethylene glycol, dipropylene glycol, tripropylene glycol, tetrapropylene glycol, poly(oxytetramethylene) glycol with a molecular weight of up to 650, alkoxylation products of bisphenol A, alkoxylation products of bisphenol F, of isomeric dihydroxyanthracenes, of isomeric dihydroxynaphthalenes, of pyrocatechol, of resorcinol, of hydroquinone with up to 8 alkoxy units per aromatic hydroxy group or mixtures of the above diols.

This reaction of the monomeric diisocyanates with the diols takes place by a method that is known per se, optionally with the addition of aprotic solvents. In order to avoid the formation of higher oligomers, a high stoichiometric excess of diisocyanates in relation to the diols used is usefully employed. Catalysts that are known per se can optionally be used to accelerate the reaction between the isocyanate group and the alcohol group. The reaction and the stoichiometric ratio of monomeric diisocyanate to diol should be selected such that exclusively a 2:1 adduct of monomeric diisocyanate and diol is formed, as far as possible, and the formation of higher oligomers is largely suppressed.

On completion of the reaction, the reaction product is freed from monomeric diisocyanate as far as possible; the resulting high molecular-weight diisocyanate within the meaning of this invention should contain no more than 10, preferably no more than 5 and especially no more than 2 wt. % monomeric diisocyanate, based on the high molecular-weight diisocyanate. The proportion by weight of the monomeric diisocyanate is determined by gas chromatography. The purification step can take place by methods that are known per se. When low alkanediols are used, it has proved useful to take advantage of the low solubility of the high molecular-weight diisocyanate in some solvents, in that, on completion of the diol/diisocyanate reaction, a non-solvent for the high molecular-weight diisocyanate is added, which is, at the same time, a solvent for the monomeric diisocyanate. As a result, the high molecular-weight diisocyanate is precipitated out of the reaction mixture and freed from unreacted monomeric diisocyanate by filtration or centrifugation. This method should be employed especially when the lower-volatility monomeric diisocyanates, such as e.g. MDI, are to be used.

Non-solvents in this case are, in particular, non-polar, aprotic, organic solvents, such as e.g. ethyl acetate, chlorobenzene, xylenes, toluene or, in particular, special boiling-point spirits.

When volatile monomeric diisocyanates, such as e.g. TDI, TMXDI, IPDI, XDI are used, the excess monomeric diisocyanate can also be removed from the reaction mixture by distillation. For this purpose, the distillation preferably takes place under vacuum with the aid of a thin-layer evaporator or a thin-film evaporator. These distillation methods are described e.g. in Kunststoff-Handbuch volume 7, "Polyurethane", G. W. Becker (editor), Hanser-Verlag, Munich, 3rd edition 1993, page 425.

Another way of removing the monomeric diisocyanate from the reaction mixture is the selective extraction of the monomeric diisocyanate, e.g. using supercritical carbon dioxide or other supercritical aprotic solvents. This extraction method is known e.g. from WO-97/46603.

The monomer-free or low-monomer, high molecular-weight diisocyanate produced in this way is reacted with polyols in a second reaction step, by a method that is known per se, to give prepolymers. The NCO/OH ratio is 1.2:1–5:1. Since the high molecular-weight diisocyanate is already very largely monomer-free, higher NCO/OH ratios of up to 10:1 can be used in the second reaction step.

A large number of higher molecular-weight polyhydroxy compounds can be used as polyols in this process. The polyhydroxy compounds with two or three hydroxyl groups per molecule in the molecular weight range of 400 to 20000, preferably in the range of 1000 to 6000, which are liquid at room temperature, glassy solid/amorphous or crystalline, are preferably suitable as polyols. Examples are di- and/or trifunctional polypropylene glycols; random and/or block copolymers of ethylene oxide and propylene oxide can also be used. Another group of polyethers that can preferably be used are the polytetramethylene glycols (poly(oxytetramethylene)glycol, poly-THF), which are produced e.g. by the acid polymerisation of tetrahydrofuran, the molecular weight range of these polytetramethylene glycols lying between 600 and 6000, preferably in the range of 800 to 5000. The liquid, glassy amorphous or crystalline polyesters that can be produced by condensation of di- or tricarboxylic acids, such as e.g. adipic acid, sebacic acid, glutaric acid, azelaic acid, suberic acid, undecanedioic acid, dodecanedioic acid, 3,3-dimethyl-glutaric acid, terephthalic acid, isophthalic acid, hexahydrophthalic acid, dimerised fatty acid or mixtures thereof with low molecular-weight diols or triols, such as e.g. ethylene glycol, propylene glycol, diethylene glycol, triethylene glycol, dipropylene glycol, 1,4-butanediol, 1,6-hexanediol, 1,8-octanediol, 1,10-decanediol, 1,12-dodecanediol, dimerised fatty alcohol, glycerin, trimethylolpropane or mixtures thereof, are also suitable as polyols.

Another group of polyols to be used according to the invention are polyesters based on $\epsilon$-caprolactone, also known as "polycaprolactones".

However, polyester polyols of oleochemical origin can also be used. These polyester polyols can be produced, for example, by the complete ring opening of epoxidised triglycerides of an at least partially olefinically unsaturated, fatty acid-containing fat mixture with one or more alcohols with 1 to 12 C atoms and subsequent partial transesterification of the triglyceride derivatives to alkyl ester polyols with 1 to 12 C atoms in the alkyl radical. Other suitable polyols are polycarbonate polyols and dimerised diols (Henkel), as well as castor oil and its derivatives. The hydroxyfunctional polybutadienes, as obtainable, for example, with the trade name "Poly-bd", can be used as polyols for the compositions according to the invention.

Linear and/or slightly branched acrylic ester copolymer polyols, which are produced, for example, by the free-radical copolymerisation of acrylates or methacrylates with hydroxyfunctional acrylic acid and/or methacrylic acid compounds, such as hydroxyethyl (meth)acrylate or hydroxypropyl (meth)acrylate, are also suitable as polyols. Because of this method of production, the hydroxyl groups in these polyols are usually randomly distributed, so that these are either linear or slightly branched polyols with an average OH functionality. Although the difunctional compounds are preferred for the polyols, polyols with higher functionality can also be used, at least in smaller quantities.

The selection of the polyol or polyols depends on the type of application of this adhesive/sealant composition. For highly viscous or paste-like liquid adhesives/sealants, at least predominantly liquid polyols are preferably used. In the case of two-pack adhesives/sealants, one component can contain a prepolymer with reactive isocyanate terminal groups from the polyols and the second component a hydroxyfunctional polyol or hydroxyfunctional polyurethane. However, the high molecular-weight diisocyanate can also be used as hardener for a hydroxyfunctional component, the hydroxyfunctional component containing either one or more of the above polyols or a hydroxyl group-containing polyurethane prepolymer.

When the polyurethane compositions according to the invention are used as reactive hot melt adhesives, the polyol components are selected such that the composition is solid at room temperature. This can occur on the one hand by using solid amorphous and/or solid crystalline polyhydroxy compounds, but it can also occur by incorporating a considerable proportion of short-chain polyhydroxy compounds, since these compositions are also solid at room temperature because of the high concentration of urethane groupings. Selection criteria for the polyols can be found e.g. in the aforementioned paper by H. F. Huber and H. Müller.

The compositions according to the invention can optionally also contain catalysts which accelerate the formation of the polyurethane prepolymer during its production and/or which accelerate the moisture curing after application of the adhesive/sealant. The organo-metallic compounds of tin, iron, titanium or bismuth, such as tin(II) salts of carboxylic acids, e.g. tin(II) acetate, tin(II) ethyl hexoate and tin(II) diethyl hexoate, are suitable as catalysts that can be used according to the invention. Another class of compounds is represented by the dialkyltin(IV) carboxylates. The carboxylic acids have 2, preferably at least 10, especially 14 to 32 C atoms. Dicarboxylic acids can also be used. The following can be expressly mentioned as acids: adipic acid, maleic acid, fumaric acid, malonic acid, succinic acid, pimelic acid, terephthalic acid, phenylacetic acid, benzoic acid, acetic acid, propionic acid and 2-ethylhexanoic, caprylic, capric, lauric, myristic, palmitic and stearic acid. Specific compounds are dibutyltin and dioctyltin diacetate, maleate, bis(2-ethyl hexoate), dilaurate, tributyltin acetate, bis(β-methoxycarbonylethyl)tin dilaurate and bis(β-acetylethyl) tin dilaurate.

Tin oxides, sulfides and thiolates can also be used. Specific compounds are: bis(tributyltin)oxide, bis(trioctyltin) oxide, dibutyltin and dioctyltin bis(2-ethylhexyl thiolate), dibutyltin and dioctyltin didodecyl thiolate, bis(β-methoxycarbonylethyl)tin didodecyl thiolate, bis(β-acetylethyl)tin bis(2-ethylhexyl thiolate), dibutyltin and dioctyltin didodecyl thiolate, butyltin and octyltin tris(thioglycolic acid 2-ethyl hexoate), dibutyltin and dioctyltin bis(thioglycolic acid 2-ethyl hexoate), tributyltin and trioctyltin (thioglycolic acid 2-ethyl hexoate) and butyltin and octyltin tris(thioethylene glycol 2-ethyl hexoate), dibutyltin and dioctyltin bis (thioethylene glycol 2-ethyl hexoate), tributyltin and trioctyltin (thioethylene glycol 2-ethyl hexoate) with the general formula $R_{n+1}Sn\ (SCH_2CH_2OCOC_8H_{17})_{3-n}$, wherein R is an alkyl group with 4 to 8 C atoms, bis(β-methoxycarbonylethyl)tin bis(thioethylene glycol 2-ethyl hexoate), bis(β-methoxycarbonylethyl)tin bis(thioglycolic acid 2-ethyl hexoate) and bis(β-acetylethyl)tin bis(thioethylene glycol 2-ethyl hexoate) and bis(S-acetylethyl)tin bis(thio-glycolic acid 2-ethyl hexoate).

In addition, aliphatic tertiary amines are also suitable, especially with a cyclic structure. Among the tertiary amines, those additionally having groups that are reactive towards the isocyanates, especially hydroxyl and/or amino groups, are also suitable. The following can be mentioned specifically: dimethylmonoethanolamine, diethylmonoethanolamine, methylethylmonoethanolamine, triethanolamine, trimethanolamine, tripropanolamine, tributanolamine, trihexanolamine, tripentanolamine, tricyclohexanolamine, methyldiethanolamine, ethyldiethanolamine, propyldiethanolamine, butyldiethanolamine, pentyldiethanolamine, hexyldiethanolamine, cyclohexyldiethanolamine, phenyldiethanolamine and the ethoxylation and propoxylation products thereof, diazabicyclooctane (DABCO), triethylamine, dimethylbenzylamine (Desmorapid DB, BAYER), bisdimethylaminoethyl ether (Calalyst A 1, UCC), tetramethylguanidine, bisdimethylaminomethyl phenol, 2-(2-dimethylaminoethoxy)ethanol, 2-dimethylaminoethyl-3-dimethylaminopropyl ether, bis(2-dimethylaminoethyl) ether, N,N-dimethylpiperazine, N-(2-hydroxyethoxyethyl)-2-azanorbornane, or unsaturated bicyclic amines, e.g. diazabicycloundecene (DBU) and Texacat DP-914 (Texaco Chemical), N,N,N,N-tetramethyl-1,3-butanediamine, N,N,N,N-tetramethyl-1,3-propanediamine and N,N,N,N-tetramethyl-1,6-hexanediamine. The catalysts can also be present in oligomerised or polymerised form, e.g. as N-methylated polyethyleneimine.

Especially preferred catalysts, however, are the derivatives of morpholine. Specific examples of suitable morpholino compounds are bis(2-(2,6-dimethyl-4-morpholino) ethyl)-(2-(4-morpholino)ethyl)amine, bis(2-(2,6-dimethyl-4-morpholino)ethyl)-(2-(2,6-diethyl-4-morpholino)ethyl) amine, tris(2-(4-morpholino)ethyl)amine, tris(2-(4-morpholino)propyl)amine, tris(2,4-morpholino)-butyl) amine, tris(2-(2,6-dimethyl-4-morpholino)-ethyl)amine, tris (2-(2,6-diethyl-4-morpholino)ethyl)amine, tris(2-(2-methyl-4-morpholino)ethyl)amine or tris(2-(2-ethyl-4-morpholino) ethyl)amine, dimethylaminopropyl-morpholine, bis (morpholinopropyl)methylamine, diethylaminopropylmorpholine, bis(morpholinopropyl)-ethylamine, bis(morpholinopropyl)propylamine, morpholino-propylpyrrolidone or N-morpholinopropyl-N'-methylpiperazine, dimorpholinodiethyl ether (DMDEE) or di-2,6-dimethylmorpholinoethyl)ether.

The above morpholine derivatives exhibit particularly high catalytic activity, especially for the water- (moisture-) isocyanate reaction. For this reason, even very small concentrations of catalyst are highly efficient for crosslinking or curing the adhesives; the concentrations of the catalyst in the adhesive formulation can be between 0.001 and 2 wt. %, preferably between 0.02 and 0.9 wt. %.

Furthermore, the composition according to the invention can optionally also contain stabilisers, adhesion-promoting additives such as tackifying resins, fillers, pigments, plasticisers and/or solvents.

"Stabilisers" within the meaning of this invention can be understood as, on the one hand, stabilisers that bring about a constant viscosity of the polyurethane prepolymer during production, storage or application. Monofunctional carboxylic acid chlorides, monofunctional, highly reactive isocyanates, but also non-corrosive inorganic acids, for example, are suitable for this purpose; benzoyl chloride, toluenesulfonyl isocyanate, phosphoric acid or phosphorous acid can be mentioned as examples. In addition, anti-oxidants, UV stabilisers or hydrolysis stabilisers are also meant by stabilisers within the meaning of this invention. The selection of these stabilisers depends, on the one hand, on the main components of the composition and, on the other hand, on the application conditions and the anticipated loads on the cured product. If the polyurethane prepolymer is predominantly built up of polyether building blocks, mainly anti-oxidants are necessary, optionally in combination with UV stabilisers. Examples of these are the commercial sterically hindered phenols and/or thioethers and/or substituted benzotriazoles or the sterically hindered amines of the HALS type ("Hindered Amine Light Stabiliser").

If substantial components of the polyurethane prepolymer consist of polyester building blocks, hydrolysis stabilisers, e.g. of the carbodiimide type, can be used.

If the compositions according to the invention are used as hot melt adhesives, laminating adhesives or adhesives/sealants, these can also contain tackifying resins, such as e.g. abietic acid, abietate, terpene resins, terpene phenol resins or hydrocarbon resins and fillers (e.g. silicates, talc, calcium carbonates, clays or carbon black), plasticisers (e.g. phthalates) or thixotropic agents (e.g. bentones, pyrogenic silicas, urea derivatives, fibrillated or pulped chopped fibres) or pigment pastes or pigments.

Migratory polyisocyanates having a substantially lower vapour pressure than MDI are especially suitable as adhesion-promoting additives in the embodiment according to the invention.

Mainly triisocyanates, such as e.g. thiophosphoric acid tris(p-isocyanatophenyl ester), triphenylmethane-4,4',4"-triisocyanate and especially the various isomeric trifunctional homologues of diphenylmethane diisocyanate (MDI), are suitable as migratory, adhesion-promoting polyisocyanates with a substantially lower vapour pressure than MDI. The latter mainly include isocyanato-bis((4-isocyanatophenyl)methyl)benzene, 2-isocyanato-4-((3-isocyanatophenyl)methyl)-1-((4-isocyanatophenyl)methyl)-benzene, 4-isocyanato-1,2-bis((4-isocyanatophenyl)methyl)benzene, 1-isocyanato-4-((2-isocyanatophenyl)methyl)-2-((3-isocyanatophenyl)methyl)-benzene, 4-isocyanato-α-1-(o-isocyanatophenyl)-α-3(p-isocyanatophenyl)-m-xylene, 2-isocyanato-(o-isocyanato-phenyl)-α'-(p-isocyanatophenyl)-m-xylene, 2-isocyanato-1,3-bis((2-isocyanatophenyl)methyl)benzene, 2-isocyanato-1,4-bis((4-isocyanatophenyl)methyl)benzene, isocyanatobis-((isocyanatophenyl)methyl)benzene, 1-isocyanato-2,4-bis((bis((4-isocyanatophenyl)methyl)benzene and mixtures thereof, optionally with a small proportion of higher-functional homologues. Since the trifunctional homologues of diphenylmethane diisocyanate are produced in the same way as diphenylmethane diisocyanate by the condensation of formaldehyde with aniline with subsequent phosgenation, proportions of diisocyanate are still present in the technical mixture of the trifunctional homologues of MDI, but this must be no more than 20 wt. %, based on the triisocyanate mixture, and the proportion of tetra- and higher-functional isocyanates must be no more than 25 wt. %.

Adducts of diisocyanates and low molecular-weight triols are also suitable as triisocyanates, especially the adducts of aromatic diisocyanates and triols, such as e.g. trimethylolpropane or glycerin. The above restrictions relating to the diisocyanate content and the higher-functional components also apply to these adducts. Aliphatic triisocyanates, such as e.g. the biuretisation product of hexamethylene diisocyanate (HDI) or the isocyanuratisation product of HDI, or the same trimerisation products of isophorone diisocyanate (IPDI), are also suitable for the compositions according to the invention, provided that the proportion of diisocyanates is <1 wt. % and the proportion of tetra- and higher-functional isocyanates is no more than 25 wt. %.

Owing to their good availability, the aforementioned trimerisation products of HDI and IPDI are particularly preferred.

The aforementioned migratory polyisocyanates can either be incorporated directly in the prepolymer synthesis or, however, they can be mixed into the prepolymer mixture still in the reaction vessel immediately after the prepolymer synthesis in a so-called "one-pot" reaction. Another option consists in adding the adhesion-promoting, migratory polyisocyanates separately in a later formulation step.

For use as a laminating adhesive, an addition of epoxy resins, phenolic resins, novolak resins, resol resins or melamine resins and similar may also be necessary to achieve certain additional properties, such as heat resistance and chemical resistance. In this case, the prepolymers can also be produced in solution, preferably in polar, aprotic solvents. The preferred solvents have a boiling range of about 50° C. to 140° C. Although halogenated hydrocarbons are also suitable, ethyl acetate, methyl ethyl ketone (MEK) or acetone are especially preferred.

The adhesive/sealant compositions according to the invention can be used, like the conventional, known polyurethane adhesives/sealants, as a reactive, one- or two-pack adhesive/sealant, as a reactive hot melt adhesive or as a solvent-based adhesive in one- or two-pack form. A considerable advantage compared with the known polyurethane adhesives/sealants the significantly smaller proportion of monomeric diisocyanates with a molecular weight of less than 500, which are toxic from a workshop hygiene point of view.

EXAMPLES

1. Production of High Molecular-Weight Diisocyanates

The monomeric diisocyanates were added to ethyl acetate and heated to 50° C. The heating was then turned off and the appropriate diol was metered in within 10 minutes. Owing to the heat of reaction, the reaction mixture heated up to approx. 60° C. After a 15 minute reaction period, the mixture was heated to 80° C. A further 15 minutes later, the catalyst was added and the reaction was continued for a further 30 minutes. Ethyl acetate, chlorobenzene, naphtha, acetone, n-heptane and xylene were used as precipitating agents for the high molecular-weight diisocyanate. The properties of the high molecular-weight diisocyanates are listed in table 1 which follows:

TABLE 1

| Example | Monomeric diisocyanate | Diol[1] | Molar ratio | Solvent | Catalyst[2] | Work up[3] | Monomer content | NCO content |
|---|---|---|---|---|---|---|---|---|
| 1 | MDI | ethylene glycol | 10:2 | ethyl acetate | 2 dr. DBTL | A1 | <0.5% | 14.1% |
| 2 | MDI | NPG | 10:1 | ethyl acetate | 2 dr. DBTL | A2 | <0.8% | 13.0% |
| 3 | MDI | diethylene glycol | 10:1 | ethyl acetate | 2 dr. DBTL | A1 | <0.5% | 13.0% |
| 4 | MDI | 1,3-propanediol | 10:1 | ethyl acetate | 2 dr. DBTL | A1 | <0.5% | 13.9% |
| 5 | MDI | NPG | 10:1 | xylene | — | A1 | <0.5% | 13.1% |
| 6 | MDI | HPN | 10:1 | ethyl acetate | 2 dr. DBTL | A1 | <0.6% | 11.0% |
| 7 | MDI | diethylene | 10:2 | ethyl | 2 dr. DBTL | A3 | <0.5% | 12.7% |

TABLE 1-continued

| Example | Monomeric diisocyanate | Diol[1] | Molar ratio | Solvent | Catalyst[2] | Work up[3] | Monomer content | NCO content |
|---|---|---|---|---|---|---|---|---|
| 8 | MDI | glycol HPN | 10:2 | ethyl acetate | — | A4 | <0.5% | 10.7% |
| 9 | TDI | ethylene glycol | 10:1 | ethyl acetate | 2 dr. DBTL | A5 | <0.6% | 19.7% |
| 10 | MDI | 1,2-propylene glycol | 10:4 | ethyl acetate | DBTL | A6 | <0.8% | 13.2% |
| 11 | MDI | 1,2-propylene glycol | 10:2 | ethyl acetate | DBTL | A7 | <0.6% | 13.9% |
| 12 | MDI | 1,2-propylene glycol | 10:2 | ethyl acetate | DBTL | A8 | <0.6% | 19.2% |

Notes to the table:
[1] NPG: neopentyl glycol, HPN: neopentyl glycol hydroxypivalate
[2] dr.: drops, DBTL: dibutyltin dilaurate
[3] Methods of working up:
A1: isolation after precipitating the reaction mixture during synthesis
A2: as A1, followed by crystallising out in a refrigerator to complete the precipitation
A3: as A1, filtrate precipitated with hexane
A4: crystallisation in refrigerator, precipitation with hexane
A5: as A1, then filtrate treated with hexane
A6: precipitated and washed with naptha
A7: precipitated and washed with naptha and washed with chlorobenzene As can be seen from the table, the monomer residues can be reduced to less than 0.5 wt. % by subsequent recrystallising/washing of the high molecular-weight diisocyanate in aprotic solvents.

2. Reaction of the High Molecular-Weight Diisocyanates with Polyols

Example 13

The high molecular-weight diisocyanate of example 11 was reacted by a known method with the hydroxyfunctional polyester Dynacoll 7380 (Creanova, polyester of dodecanedioic acid and 1,6-hexanediol, OH value 30) (characteristic number 2.2). The resulting PU prepolymer had an NCO content of 1.97 wt. % (theoretical value 2.01 wt. %) and a viscosity of 24.8 Pa.s at 130° C. The residual monomer content was <0.1 wt. %. This product displayed good properties as a reactive hot melt adhesive.

Example 14

The high molecular-weight diisocyanate of example 12 was reacted with Dynacoll 7380 (characteristic number 2.2) by the same method as example 13. NCO content 2.1 wt. % (theoretical value 2.16 wt. %), viscosity 9.6 Pa.s at 130° C. The residual monomer content was <0.1 wt. %. This product also displayed good properties as a reactive hot melt adhesive.

Example 15

Comparison

For comparison purposes, a standard prepolymer for a PU hot melt adhesive consisting of 4,4'-diphenylmethane diisocyanate was reacted with Dynacoll 7380 (characteristic number 2.2). NCO content 2.31 wt. % (theoretical value 2.35 wt. %), viscosity 4.5 Pa.s at 130° C. The residual monomer content was determined as 2.8 wt. %. While it is true that the compositions according to the invention have a somewhat higher melt viscosity compared with the comparison product, this does not impair their use as hot melt adhesives. The substantial advantage compared with the prior art is the substantially reduced content of monomeric diisocyanate in the hot melt adhesive according to the invention.

Example 16

In the same way, a high molecular-weight diisocyanate was made from a polypropylene glycol with Mn=880 and diphenylmethane diisocyanate, from which the monomeric MDI was then removed to the extent that a residual monomer content of 0.1% resulted. A hot melt adhesive was produced from 100 parts of a polyol mixture for a standard polyurethane hot melt adhesive (QR 6202, Henkel) with an average OH value of 32.5 and 76.5 parts of the aforementioned high molecular-weight diisocyanate.

Example 17

In the same way, a hot melt adhesive was made from 100 parts of a polyol mixture with an average hydroxyl value of 32.5, 6 parts ethylene vinyl acetate copolymer (vinyl acetate content 28%) and 66.7 parts of the aforementioned high molecular-weight diisocyanate.

Example 18

2 wt. % tris(6-isocyanatohexyl)isocyanurate—HDI trimer, residual monomer content 0.2%—was subsequently mixed into the hot melt adhesive according to example 16.

Example 19

In the same way as in example 18, 2 wt. % HDI trimer was mixed into the hot melt adhesive of example 2.

Test of Suitability for Application

The hot melt adhesives of examples 16 and 18 were tested in comparison with a standard hot melt adhesive from the prior art (PURMELT QR 6202, Henkel), comparative example 21, for their suitability for the film coating of MDF (medium-density fibres). The results are summarised in table 2 which follows.

TABLE 2

|  | Example 16 | Example 21 |
|---|---|---|
| Processing |  |  |
| Roller temperature: [° C.] | 150 | 150 |
| Cobwebbing: | very good | very good |
| Wetting: | 1–2 | 1–2 |
| Wetting profile: | 1–2 | 1–2 |
| Other: |  |  |
| Test: |  |  |
| Initial strength of PVC film: | 3.5 | 3.88 |
| Initial strength of veneer: | 2.5 | 2.75 |
| Initial strength of CPL: | 2.75 | 3.0 |
| PVC film adhesion: | 1.75 | 1.75 |
| Veneer adhesion: | 1.75 | 1.75 |
| CPL adhesion: | 1.75 | 1.75 |
| Thermal stability of PVC film: [° C.] | 148.2 | >150 |
| Thermal stability of veneer: [° C.] | 150.0 | >150 |
| Thermal stability of CPL: [° C.] | 148.2 | >150 |
| Low-temperature stability of PVC film: [° C.] | <−30 | <−30 |
| Low-temperature stability of veneer: [° C.] | <−30 | <−30 |
| Low-temperature stability of CPL: [° C.] | <−30 | <−30 |

The strengths were evaluated by the German school system of marking, with 1 = very good to 5 = unsatisfactory.

As can be seen from the table, the initial strengths of the adhesive according to example 16 are evaluated as significantly better than those of a commercial hot melt adhesive for the same application. Only the thermal stability is lower than with the conventional hot melt adhesive.

When using the adhesive according to the invention as in example 18, the initial strength is also clearly better compared with comparative example 21, i.e. the heat resistance reaches values of >150° C. and thus contains a clear improvement compared with example 16. In other words, the requirements both for a very low content of volatile, low molecular-weight diisocyanates and for good adhesion and thermal stability properties are met in this case.

For a window profile coating (primed PVC profile with PVC film), hot melt adhesives from examples 17 and 19 were comparatively tested with a hot melt adhesive from the prior art for this application. The commercial hot melt adhesive from the prior art was PURMELT QR 5300 (Henkel), comparative test 20. The test results are compiled in table 3.

TABLE 3

| Example | Profile temperature [° C.] | Peel strength [N/mm] after |  |  |  |  |  |
|---|---|---|---|---|---|---|---|
|  |  | 10 min | 1 h | 4 h | 1 d | 2 d | 7 d |
| 17 | 20 | 0.3 | 0.4 | 0.8 | 2.8 | 2.9 | 3.1 |
| 19 | 20 | 0.7 | 1.7 | 1.7 | 3.2 | 3.7 FR | 4.2 FR |
| 20 | 20 | <0.1 | 0.1 | 0.9 | 2.7 | 4.3 FR | 4.7 FR |

TABLE 3-continued

| Example | Profile temperature [° C.] | Peel strength [N/mm] after |  |  |  |  |  |
|---|---|---|---|---|---|---|---|
|  |  | 10 min | 1 h | 4 h | 1 d | 2 d | 7 d |
| 17 | 53 | 0.6 | 0.9 | 1.0 | 3.2 | 2.9 | 3.1 |
| 19 | 50 | 1.5 | 1.9 | 1.7 | 3.2 | 3.6 FR | 4.3 FR |
| 20 | 50 | 1.1 | 1.3 | 1.4 | 3.6 FR | 3.9 FR | 3.8 FR |

Evaluation of Results:

The hot melt adhesive according to example 17 displays very good processing properties, good wetting on the substrates, cobwebbing on peeling and a somewhat higher initial peel strength than comparative example 20 from the prior art. In the course of the chemical curing reaction, however, the desired film tear without peeling (FR) is not achieved in example 17. In example 19 according to the invention, not only are high initial peel strengths achieved, but the desired film tear is also achieved after advanced curing of the hot melt adhesive. Here too, the adhesion-improving additive according to the invention brings about clearly improved adhesive properties, combined with the absence of volatile, low molecular-weight monomeric diisocyanates.

It is clear from the above results that, while it is true that the hot melt adhesives according to examples 17 and 18 have excellent properties in respect of their low content of monomeric, volatile diisocyanates, their adhesion properties are inferior compared with commercial hot melt adhesives based on conventional, low molecular-weight diisocyanates. The hot melt adhesive compositions according to examples 18 and 19 display adhesion properties equally as good as the conventional hot melt adhesives of the prior art, and in addition, they have the low content of volatile monomeric diisocyanates.

What is claimed is:

1. A reactive polyurethane composition comprising a reaction product of one or more polyols having a molecular weight range of 400 to 20,000 and one or more diisocyanate prepolymers containing no more than 10 wt. % monomeric diisocyanate based on the weight of the diisocyanate prepolymer, wherein said diisocyanate prepolymers are, in turn, the reaction product of one or more diols having a number average molecular weight of less than 2000 and a 1.2:1 to 10:1 stoichiometric excess of one or more monomeric diisocyanates having a molecular weight of less than 500, followed by separation from or removal of unreacted monomeric diisocyanate from said diisocyanate prepolymer; said reactive polyurethane composition comprising terminal isocyanate groups; wherein the polyol and the diol are not identical.

2. The reactive polyurethane composition according to claim 1 wherein the diols have a number average molecular-weight of no more than 1500.

3. The reactive polyurethane composition according to claim 1 wherein the stoichiometric excess of monomeric diisocyanate to the diols is from 5:2 to 10:1.

4. The reactive polyurethane composition according to claim 1 wherein the diisocyanate prepolymers contain no more than 5 wt. % monomeric diisocyanate, based on the weight of the diisocyanate prepolymer, before their reaction with said polyols.

5. The reactive polyurethane composition according to claim 1 wherein the one or more monomeric diisocyanate reactants are one or more isomers of tolylene diisocyanate (TDI), 1,5-naphthalene diisocyanate, 4,4'-diphenylmethane diisocyanate, 2,4'-diphenylmethane diisocyanate, xylene diisocyanate (XDI), 4,4'-dicyclohexylmethane diisocyanate ($H_{12}$MDI), 1-isocyanatomethyl-3-isocyanato-1,5,5-trimethyl diisocyanate (isophorone diisocyanate, IPDI), cyclohexane 1,4-diisocyanate, hydrogenated xylylene diisocyanate ($H_6$XDI), 1-methyl-2,4-diisocyanatocyclohexane, hexane-1,6-diisocyanate (HDI), m- or p-tetramethylxylene diisocyanate (m-TMXDI, p-TMXDI) or mixtures thereof.

6. The reactive polyurethane composition according to claim 1 wherein the diols are selected from the group of $C_2$–$C_{18}$ alkanediols.

7. The reactive polyurethane composition according to claim 1 wherein the diols are ethylene glycol, 1,2-propanediol, 1,3-propanediol, 2,2-dimethyl-1,3-propanediol, 2-methylpropanediol, 1,6-hexanediol, 2,4,4-trimethyl-1,6-hexanediol, 2,2,4-trimethyl-1,6-hexanediol, 1,4-cyclohexane-dimethanol, or mixtures thereof.

8. The reactive polyurethane composition according to claim 1 wherein the polyols are one or more di- or trifunctional polyethylene glycols, polypropylene glycols, random or block copolymers of ethylene oxide and propylene oxide, poly(oxytetramethylene)glycols, linear or branched polyester polyols, poly-ε-caprolactones, hydroxyfunctional polybutadienes or the hydrogenation products thereof, hydroxyfunctional poly(meth)acrylates, or mixtures thereof.

9. The reactive polyurethane composition according to claim 8 wherein the molecular weight of said polyols is from 1000 to 6000.

10. A reactive polyurethane composition comprising a reaction product of one or more polyols having a molecular weight range of 400 to 20,000, one or more migratory polyisocyanates, wherein said migratory polyisocyanates have 3 NCO groups and a lower vapor pressure than diphenylmethane diisocyanate, and one or more diisocyanate prepolymers containing no more than 10 wt. % monomeric diisocyanate based on the weight of the diisocyanate prepolymer, wherein said diisocyanate prepolymers are, in turn, the reaction product of one or more diols having a number average molecular weight of less than 2000 and a 1.2:1 to 10:1 stoichiometric excess of one or more monomeric diisocyanates having a molecular weight of less than 500, followed by separation from or removal of unreacted monomeric diisocyanate from said diisocyanate prepolymer; said reactive polyurethane composition comprising terminal isocyanate groups.

11. The reactive polyurethane composition according to claim 10 wherein the migratory polyisocyanates are thiophosphoric acid tris(p-isocyanatophenyl ester), triphenylmethane-4,4',4"-triisocyanate, isomeric trifunctional homologues of diphenylmethane diisocyanate (MDI), isocyanatobis((4-isocyanatophenyl)methyl)benzene, 2-isocyanato-4-((3-isocyanatophenyl)methyl)-1-((4-isocyanatophenyl)methyl)benzene, 4-isocyanato-1,2-bis((4-isocyanatophenyl)methyl)benzene, 1-isocyanato-4-((2-isocyanatophenyl)methyl)-2-((3-isocyanatophenyl)methyl)-benzene, 4-isocyanato-α-1-(o-isocyanatophenyl)-α-3-(p-isocyanatophenyl)-m-xylene, 2-isocyanato-(o-isocyanato-phenyl)-α'-(p-isocyanatophenyl)-m-xylene, 2-isocyanato-1,3-bis((2-isocyanatophenyl)methyl)benzene, 2-isocyanato-1,4-bis((4-isocyanatophenyl)methyl)benzene, isocyanatobis((isocyanatophenyl)-methyl)benzene, and 1-isocyanato-2,4-bis((bis((4-isocyanatophenyl)methyl)benzene; adducts of aromatic diisocyanates and triols, trimethylolpropane, glycerin; the biuretisation product of hexamethylene diisocyanate (HDI); the isocyanuratisation product of HDI; the trimerisation products of isophorone diisocyanate (IPDI); or mixtures thereof.

12. The reactive polyurethane composition according to claim 10 wherein the migratory polyisocyanates are the biuretisation product of hexamethylene diisocyanate (HDI), the isocyanuratisation product of HDI; the trimerisation products of isophorone diisocyanate (IPDI) or mixtures thereof, wherein the proportion of diisocyanates is less than 1 wt % and the proportion of tetra- and higher-functional isocyanates is no more than 25 wt % based on the weight of the migratory polyisocyanate.

13. A process for the production of a reactive polyurethane composition, said process comprising
 (a) reacting one or more diols having a number average molecular weight of less than 2000 with a 1.2:1 to 10:1 stoichiometric excess of one or more monomeric diisocyanates having a molecular weight of less than 500 to yield a diisocyanate prepolymer;
 (b) isolating the resulting diisocyanate prepolymer from unreacted monomeric diisocyanates, whereby the isolated diisocyanate prepolymer contains no more than 10 wt. % of monomeric diisocyanates, based on the weight of the diisocyanate prepolymer; and
 (c) reacting the resulting diisocyanate prepolymer containing no more than 10 wt. % monomeric diisocyanate with a polyol to yield a reactive polyurethane prepolymer with isocyanate terminal groups.

14. The process according to claim 13 wherein the isolation of step (b) is accomplished by one or more of the following means:
 (i) precipitating out of the reaction mixture of step (a) the resulting diisocyanate prepolymer, optionally by adding a non-solvent for the diisocyanate prepolymer;
 (ii) distilling off the excess monomeric diisocyanate from the reaction mixture of step (a); and
 (iii) selectively extracting the excess monomeric diisocyanate from the reaction mixture of step (a).

15. The process according to claim 13 wherein the stoichiometric excess of the monomeric diisocyanates to the diols is from 5:2 to 10:1.

16. The process according to claim 13 wherein the diols have a number average molecular weight of no more than 1500.

17. The process according to claim 13 wherein in step (a) the reaction conditions and stoichiometric ratio of monomeric diisocyanates to diols are selected such that exclusively a 2:1 reaction product of monomer diisocyanates and diols is formed.

18. The process according to claim 13 wherein, in step (c), the NCO/OH ratio is 1.2:1 to 5:1.

19. The process according to claim 13 wherein the resulting diisocyanate prepolymer produced in step (b) contains no more than 5 wt. % of monomeric diisocyanate based on the weight of the diisocyanate prepolymer.

20. The process according to claim 13 wherein the resulting diisocyanate prepolymer produced in (b) contains no more than 2 wt. % of monomeric diisocyanate based on the weight of the diisocyanate prepolymer.

21. The process according to claim 13 wherein the monomeric diisocyanates used in step (a) are isomers of-tolylene diisocyanate (TDI), 1,5-naphthalene diisocyanate, 4,4'-diphenylmethane diisocyanate, 2,4'-diphenylmethane diisocyanate, xylene diisocyanate (XDI), 4,4'-dicyclohexylmethane diisocyanate ($H_{12}$MDI), 1-isocyanatomethyl-3-isocyanato-1,5,5-trimethyl diisocyanate (isophorone diisocyanate, IPDI), cyclohexane 1,4-diisocyanate, hydrogenated xylylene diisocyanate ($H_6XDI$), 1-methyl-2,4-diisocyanatocyclohexane, hexane-1,6-diisocyanate (HDI), m- or p-tetramethylxylene diisocyanate (m-TMXDI, p-TMXDI), or mixtures thereof.

22. The process according to claim 13 wherein the diols used in step (a) are $C_2$–$C_{18}$ alkanediols, polyethers or alkoxylation products of dihydroxy-phenols.

23. The process according to claim 22 wherein the diols used in step (a) are ethylene glycol, 1,2-propanediol, 1,3-propanediol, 2,2-dimethyl-1,3-propanediol, 2-methylpropanediol, 1,6-hexanediol, 2,4,4-trimethyl-1,6-hexanediol, 2,2,4-trimethyl-1,6-hexanediol, 1,4-cyclohexane-dimethanol, diethylene glycol, triethylene glycol, tetraethylene glycol, dipropylene glycol, tripropylene glycol, tetrapropylene glycol, poly(oxytetramethylene) glycol with a molecular weight of up to 650, alkoxylation products of bisphenol A, of bisphenol F, of isomeric dihydroxyanthracenes, of isomeric dihydroxynaphthalenes, of pyrocatechol, of resorcinol, or of hydroquinone with up to 8 alkoxy units per aromatic hydroxy group, or mixtures thereof.

24. The process according to claim 13 wherein the polyols used in step (c) are one or more di- or trifunctional polyethylene glycols, polypropylene glycols, random or block copolymers of ethylene oxide and propylene oxide, poly(oxytetramethylene)glycols, linear or branched polyester polyols, poly-ε-caprolactones, hydroxyfunctional polybutadienes or the hydrogenation products thereof, hydroxyfunctional poly(meth)acrylates, or mixtures of the above polyols, wherein the number average of the molecular weight of said polyols is 400 to 20000.

25. The process according to claim 24 wherein the number average molecular weight of said polyols is from 1000 to 6000.

26. The process according to claim 13 further comprising the addition of one or more migratory polyisocyanates, wherein said migratory polyisocyanates have 3 NCO groups and a lower vapor pressure than diphenylmethane diisocyanate, in the following manner during said process:
   (A) to the reaction mixture in step (c), or
   (B) to the prepolymer mixture immediately after step (c).

27. The process according to claim 26 wherein the migratory polyisocyanates are thiophosphoric acid tris(p-isocyanatophenyl ester), triphenylmethane-4,4',4''-triisocyanate, isomeric trifunctional homologues of diphenylmethane diisocyanate (MDI), isocyanato-bis((4-isocyanatophenyl)methyl)benzene, 2-isocyanato-4-((3-isocyanatophenyl)methyl)-1-((4-isocyanatophenyl)methyl)benzene, 4-isocyanato-1,2-bis((4-isocyanatophenyl)methyl)benzene, 1-isocyanato-4-((2-isocyanatophenyl)methyl)-2-((3-isocyanatophenyl)methyl)-benzene, 4-isocyanato-α-1-(o-isocyanatophenyl)-α-3(p-isocyanatophenyl)-m-xylene, 2-isocyanato-(o-isocyanatophenyl)-α'-(p-isocyanatophenyl)-m-xylene, 2-isocyanato-1,3-bis((2-isocyanatophenyl)methyl)benzene, 2-isocyanato-1,4-bis((4-isocyanatophenyl)methyl)benzene, isocyanatobis((isocyanatophenyl)-methyl)benzene, or 1-isocyanato-2,4-bis((bis((4-isocyanatophenyl)methyl)benzene; adducts of aromatic diisocyanates and triols, trimethylolpropane, glycerin; the biuretisation product of hexamethylene diisocyanate (HDI); the isocyanuratisation product of HDI; the trimerisation products of isophorone diisocyanate (IPDI); or mixtures thereof.

28. The process according to claim 26 wherein the migratory polyisocyanates are a biuretisation product of hexamethylene diisocyanate (HDI), the isocyanuratisation product of HDI; the trimerisation products of isophorone diisocyanate (IPDI) or mixtures thereof, wherein the proportion of diisocyanates is less than 1 wt % and the proportion of tetra- and higher-functional isocyanates is no more than 25 wt. % based on the weight of the migratory polyisocyanate.

29. A binder for a reactive one- or two-pack adhesive/sealant, reactive hot melt adhesive or solvent-based adhesive comprising a reactive polyurethane composition prepared according to the process of claim 13; wherein the polyol and the diol of claim 13 are not identical and the polyol has a molecular weight of from 400 to 20,000.

30. The process of claim 13, additionally comprising a step (d) wherein said reactive polyurethane prepolymer is combined with at least one additive selected from the group consisting of catalysts, stabilizers, adhesion-promoting additives, fillers, pigments, plasticizers and solvents.

31. A process for the production of a reactive polyurethane composition comprising
   (a) reacting one or more diols having a number average molecular weight of less than 2000 with a 1.2:1 to 10:1 stoichiometric excess of one or more monomeric diisocyanates having a molecular weight of less than 500 to yield a diisocyanate prepolymer;
   (b) isolating the resulting diisocyanate prepolymer from unreacted monomeric diisocyanate, whereby the isolated diisocyanate prepolymer contains no more than 10 wt. % of monomeric diisocyanates;
   (c) reacting the resulting diisocyanate prepolymer containing no more than 10 wt. % monomeric diisocyanate with a polyol to yield a reactive prepolymer with isocyanate terminal groups, and
   (d) combining said reactive prepolymer to produce a reactive polyurethane composition;
   said process further comprising the addition of one or more migratory polyisocyanates, wherein said migratory polyisocyanates have 3 NCO groups and a lower vapor pressure than diphenylmethane diisocyanate, in the following manner during said process:
   (A) to the reaction mixture in step (c),
   (B) to the prepolymer mixture immediately after step (c), or
   (c) to the reactive polyurethane composition admixture in step (d).

32. A binder for a reactive one- or two-pack adhesive/sealant, reactive hot melt adhesive or solvent-based adhesive comprising a reactive polyurethane composition prepared according to the process of claim 31; wherein the polyol and the diol of claim 31 are not identical and the polyol has a molecular weight of from 400 to 20,000.

* * * * *